Sept. 9, 1958     A. W. SERIO     2,851,299

DETACHABLE SAUCEPAN HANDLE

Filed May 2, 1957     2 Sheets-Sheet 1

INVENTOR.
Anthony W. Serio
BY Shoemaker & Mattare
ATTYS

Sept. 9, 1958
A. W. SERIO
2,851,299
DETACHABLE SAUCEPAN HANDLE
Filed May 2, 1957
2 Sheets-Sheet 2
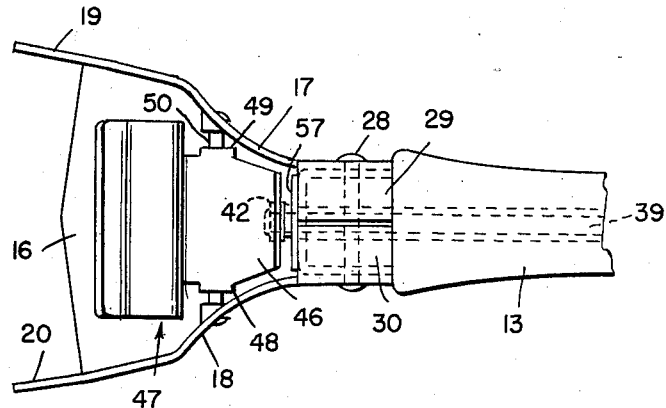
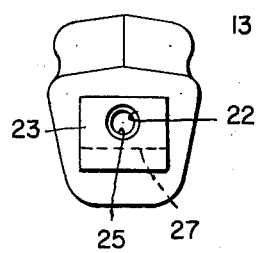
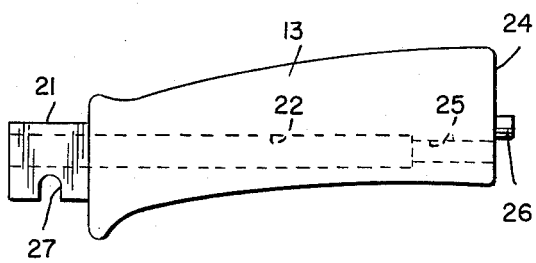
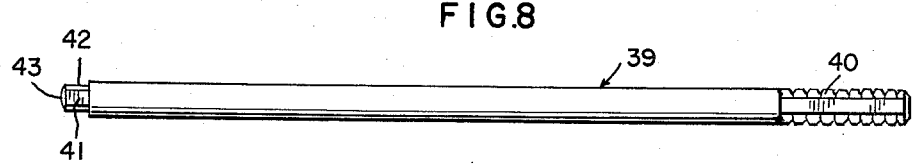
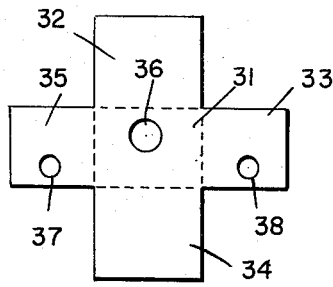
INVENTOR.
Anthony W. Serio
BY
Shoemaker & Mattare
ATTYS

United States Patent Office

2,851,299
Patented Sept. 9, 1958

2,851,299

DETACHABLE SAUCEPAN HANDLE

Anthony W. Serio, Elmira, N. Y.

Application May 2, 1957, Serial No. 656,522

6 Claims. (Cl. 294—31)

This invention relates to detachable handles for saucepans and the like and pertains more particularly to improvements therein providing a simple, yet positive lock mechanism for detachably securing a handle assembly to saucepans and similar kitchenware articles.

This invention is particularly useful in connection with dishes which are intended to be used as a casserole in which the dish, during the cooking process, becomes heated in an oven, and in conjunction therewith a removable handle assembly which may be used for removing the dish from the oven while hot without endangering the person so removing the dish, the handle being detached and being at normal room temperature.

An object of this invention is to provide an improved detachable handle assembly incorporating a rotatable end portion connected with clamping mechanism at the opposite end thereof for actuating the latter and serving to removably attach the handle to an associated saucepan or the like.

Another object of this invention is to provide an improved detachable handle assembly embodying an elongate main body portion having a bore therethrough receiving an actuating rod and carrying at one end thereof a cam element associated with a gripping means for actuating the same into and out of locked gripping engagement with an associated saucepan or the like, the opposite end of the rod being attached to a rotatable handle portion so that the cam element may be actuated thereby.

Still another object of this invention is to provide an improved handle construction of the character described embodying a foot portion having a pair of spaced leg elements disposed thereon for straddling the opposite sides of a lip projection on a saucepan or the like, with the legs bearing against the outer surface of the utensil and with the main portion of the foot operating in conjunction with a pivoted clamp element to sandwich the projection therebetween, and with the pivoted clamp element being actuated by a cam operable by twisting a portion of the handle.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 5 is a bottom plan view of the unattached handle assembly;

Fig. 6 is a side elevational view of a portion of the handle assembly with the cam, cam actuating and clamping means removed therefrom;

Fig. 7 is a front elevational view of the assembly shown in Fig. 6;

Fig. 8 is a plan view of the actuating rod; and

Fig. 9 is a plan view of an insulating member utilized in conjunction with the invention.

Figure 1:
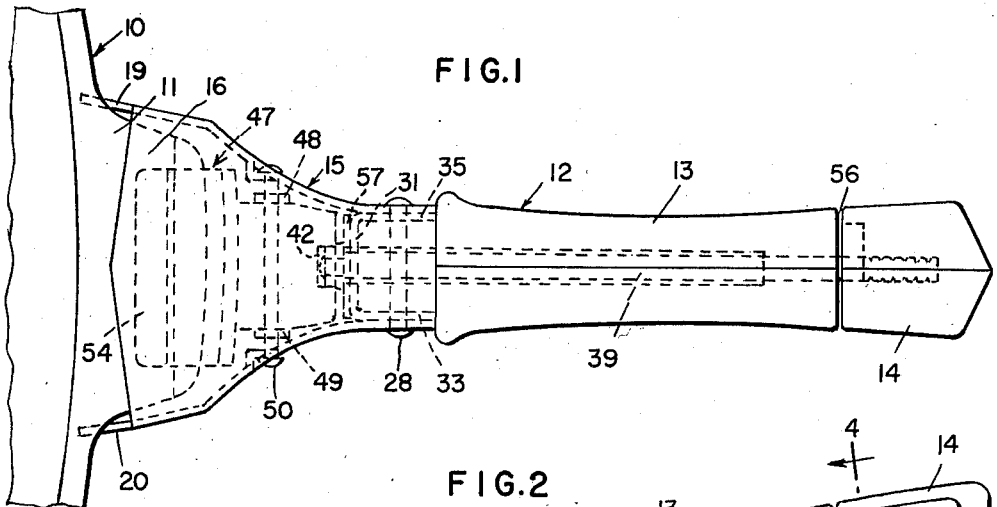
Fig. 1 is a top plan view of the improved handle construction as attached to an associated utensil, the utensil being shown partially broken away.

Referring at this time more particularly to Fig. 1, a utensil indicated generally by the reference character 10 which may be in the form of a saucepan, casserole or the like, is provided with an extension 11 or lip on its rim portion and is adapted to receive the detachable handle assembly indicated generally by the reference character 12. The handle assembly consists essentially of an intermediate main body portion 13, a separate actuating end portion 14 disposed at one end thereof and on the opposite end thereof a clamping extension indicated generally by the reference character 15.

Figure 2:
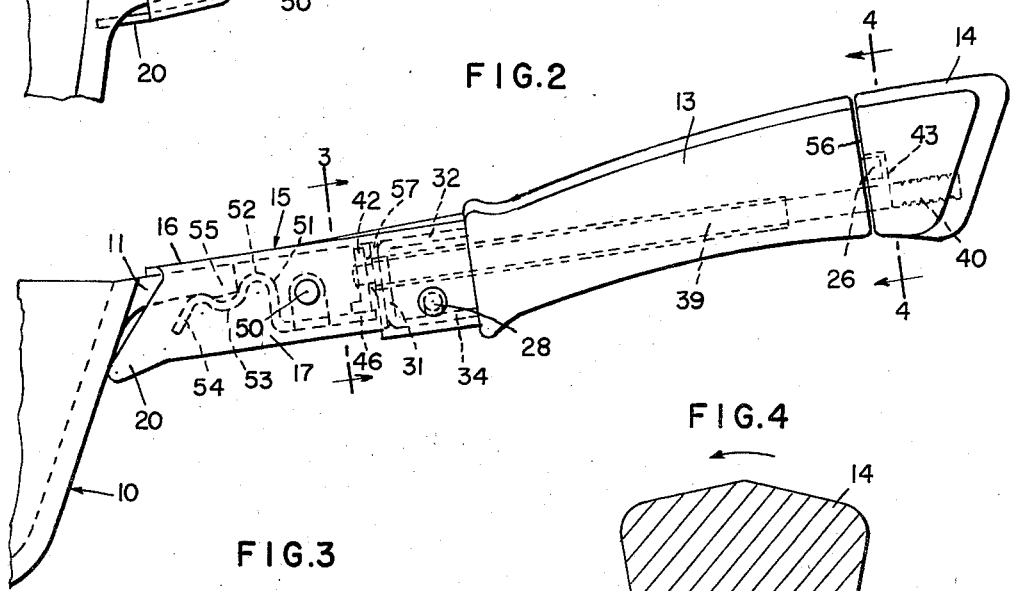
Fig. 2 is a side elevation of the assembly shown in Fig. 1.
Figure 3:
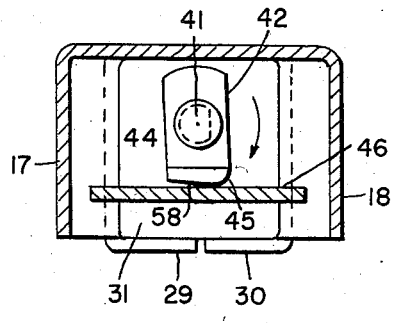
Fig. 3 is a vertical section taken substantially along the plane of section line 3—3 in Fig. 2 and showing on an enlarged scale, the cam element in locked position.

The clamping portion 15 is preferably formed of metal and includes a plate-like upper portion 16 and along opposite sides thereof the depending flange portions 17 and 18 as seen most clearly in Figs. 2 and 3, the flanges terminating at their free ends in the forwardly projecting wing portions 19 and 20. The extremities of the wing portions 19 and 20 are adapted to bear against the outer side of the utensil 10 in the manner shown most clearly in Fig. 2, while the clamping assembly 15 also includes elements clampingly engaged with the rim projection or lip 11 so that the handle is held in fixed stabilized position relative to the utensil when in the clamped position, while at the same time the construction, as hereinafter described, lends itself to rapid and easy removal.

The intermediate portion 13 of the handle assembly, as is shown most clearly in Figs. 6 and 7, is provided at its forward end with a generally rectangular, reduced extension 21 and projecting longitudinally through this handle portion is a bore 22 which opens upon the end face 23 of the projection or extension 21 and upon the rear face 24 of the handle portion. Preferably, the bore 22 includes a rear end portion 25 of reduced diameter, the purpose of which will be hereinafter more clearly described, and on the rear face 24 is provided an outwardly projecting stop pin portion 26.

The extension 21 is provided with a transverse groove 27 for cooperation with the clamping portion 15 and in this connection, it will be appreciated with the rearmost part of the portion 16 of the clamping element, taken in conjunction with the rearmost portions of the flanges 17 and 18, serves to straddle the extension 21 with the flanges 17 and 18 being provided with aligned apertures receiving the fastening assembly 28 which passes through these apertures and the groove 27 serving to hold the assembly 15 on the handle portion 13.

The flanges 17 and 18 at their rearmost ends are provided with laterally inwardly extending tab portions 29 and 30 which underlie the extension 21, see particularly Fig. 5. By this construction, portions of the assembly 15 substantially completely encompass the extension 21 and are rigidly attached thereto by the previously mentioned fastener assembly 28 serving to provide a very rigid connection therebetween. To prevent an undue amount of heat conduction from the metallic clamping assembly 15 to the handle portion 13, it is preferred to use an asbestos insulating element or elements therebetween. One such form of insulating means is illustrated in Fig. 9 which will be seen to include a central portion 31 and radially extending tabs 32, 33, 34 and 35, the central portion 31 being engaged over the front face 23 of the extension 21 and the tabs overlying respective side portions thereof. The central portion is provided with an aperture 36 aligned with the opening of the bore 22 and the two tabs 33 and 35 are provided with apertures 37 and 38 aligned with the opposite ends of the groove 27 to pass the fastening member 28.

Figure 4:
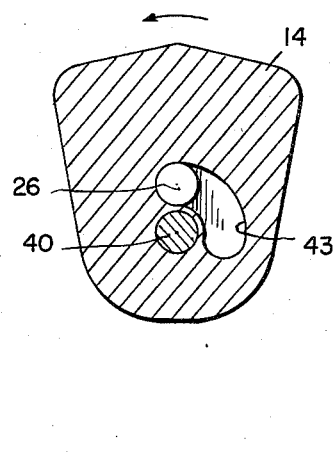
Fig. 4 is an enlarged vertical section taken substantially along the plane of section line 4—4 in Fig. 2 and illustrating details of the rotatable handle portion for actuating the clamping element.

Projecting through the bore 22 and journalled in the reduced end portion 25 thereof is the actuating rod 39 shown in Fig. 8. The rod is threaded on one end portion 40 and is provided with a reduced opposite end portion 41 which carries the cam element 42, the same being retained thereon by virtue of the headed-over portion 43 of the reduced portion 41. The actuating end portion 14 of the handle is threaddedly engaged with the threaded end portion 40 of the actuating rod as will be seen most clearly in Figs. 1 and 2. Thus, the actuating end portion 14 is rotatably mounted with respect to the handle portion 13 through the medium of the actuating rod 39. The forward face of the end portion 14 is provided with an arcuate slot 43 disposed at a constant radius to the actuating rod 39 and receiving the stop pin element 26 therein, see particularly Fig. 4. This construction permits relative rotation of the portion 14 with respect to the handle body 13 within specified limits, in this case approximately 90° or a quarter of a turn.

The previously mentioned cam 42, as can be seen most clearly from Fig. 3, is provided with a forwardly projecting foot portion 44 and the main body thereof is of elongate rectangular shape with the corner 45 of the foot being rounded as shown. This corner 45 is the one which is presented in rotation of the rod 39 into engagement with the tongue 46 of the clamp element 47. The clamp element itself is provided with a pair of upstanding ears 48 and 49 on its opposite sides and intermediate its ends, as can be seen in Figs. 1 and 5 which are provided with aligned apertures and which apertures are also aligned with openings in the side flanges 17 and 18 receiving the pivot pin element 50 serving to pivotally mount the assembly 47 between such flanges in the manner shown most clearly in Fig. 5. The forward end of the clamp element 47 is shaped in the manner shown most clearly in Fig. 2 and includes an upwardly projecting portion 51 terminating in a rounded portion 52 and extending into the trough portion 53 and terminating at its forward end edge 54 in a downwardly extending edge such that the intermediate portion of this part of the clamp assembly is of undulated or sinusoidal form, the trough 53 receiving a thickened end edge portion 55 of the lip 11 serving to firmly and effectively engage the same and clamp the upper face of the lip 11 against the undersurface of the plate portion 16. The cam 42 is actuated in response to rotation of the handle end portion 14 and since the shape of the cam is such as to be of narrow width than length, a 90° rotation of the cam, as shown in Fig. 3 and in the direction of the arrow therein, will permit the tongue 46 to move upwardly and permit pivoting of the clamp element 47 such as to drop the forward end portion thereof and release the lip 11, as will be clearly apparent. To engage the handle, the end portion 14 is rotated back to its normal position as shown in Figs. 1 and 2.

By this construction, the handle may be quickly and easily engaged with or removed from an associated utensil, such as a Pyrex saucepan or any other desired utensil with which the handle may be used.

As will be noted from Figs. 1 and 2, the handle portion 13 and the end extension 14 are spaced apart a slight amount as is indicated by the reference character 56. This spacing is purposely provided for so as to tend to minimize transfer of heat from the handle to the end portion. Also, it is to be noted that the larger bore portion 22 in the handle 13 maintains the forward end portion of the rod 39 out of direct contact with the handle. The reason for this construction is that since the rod portion 39 is metallic, it will tend to transfer heat much faster than the non-metallic portions of the assembly and it is, consequently, desirable to maintain it out of contact with the handle portion 13 so that the same will be cooler than were the rod to contact the handle throughout the extent thereof. Of course, this leaves a large portion of the rod 39 unsupported along its length and in order to provide an end support for the rod, opposite to the support attributed thereto by the bore portion 25, a metallic plate element 57 is provided to lend end support to the rod.

As previously mentioned, the rod end portion 40 can be threaded for attachment to the handle end extension 14. However, alternately and preferably this end of the rod is provided merely with a series of circular grooves so that the handle end extension 14 can be glued to the rod, the grooves serving to provide channels within which the glue is retained.

In Fig. 3, it will be noted that the bottom face 58 of the cam element 42 is at a slight angle or inclination, that is, out of perpendicular with the opposite side edges of this element. The purpose of this construction is to provide a lock tending to maintain the handle extension 14 in its normal operative position. In this connection, it will be appreciated that when the handle end extension is in the normal position with the clamp element 47 engaged with the lip projection on the utensil, the position of the cam element 42 will be such as to provide a slightly overcenter relationship tending to forcibly lock the same in place, the pin 26 at this time being engaged forcefully against its corresponding end of the groove 43.

I claim:
1. A removable handle for saucepans or the like, comprising an elongate hand grip member having a longitudinally extending bore opening upon the opposite ends thereof, an actuating rod extending through said bore and projecting beyond the opposite ends of said hand grip member and being journalled within said bore, a separate hand grip extension element secured to one end of said actuating rod and disposed in substantially abutting relationship to one end of said hand grip member, a cam element secured to the opposite end of said actuating rod, a gripping assembly fixed to said opposite end of the hand grip member and including a pivoted clamp element for selective engagement with a lip on an associated saucepan or the like, said cam being operatively engaged with said clamping element for actuation of the same upon twisting motion imparted to said extension.

2. The assembly as defined in claim 1 wherein said gripping assembly includes a plate-like upper portion having depending and forwardly extending wing elements associated therewith, said pivoted clamping member being mounted between said wing elements and cooperable with the undersurface of said plate-like portion to grip a saucepan therebetween.

3. The assembly as defined in claim 2 wherein said clamping element includes a tongue portion engaged by said cam and an opposite end portion of sinusoidal form defining a trough portion for receiving a beaded lip portion of an associated saucepan.

4. A removable handle for utensils such as saucepans and the like, comprising an elongate hand grip member having a generally rectangular extension at one end and provided with a longitudinally extending bore, an actuating rod extending through said bore and projecting beyond opposite ends of said hand grip member, said rod being journalled within said bore for rotation within said hand grip member, a hand grip extension element rigidly fixed to one end of said rod and disposed in substantially end abutting relationship to said hand grip member at the end thereof opposite the first mentioned extension, a cam element fixed to the opposite end of said rod, a gripping assembly fixed to said first extension and projecting forwardly thereof, said gripping assembly including a generally plate-like upper portion having a rear end portion overlying said first extension and having depending flanges along its opposite sides provided with rearward portions lying on opposite sides of said first extension, means rigidly affixing said gripping assembly to said first extension, said gripping assembly also including a pivoted clamping element mounted between said flanges beneath said plate-like portion and including a tongue at one end engageable by said cam and having an opposite end portion movable toward and away from the undersurface of said plate-like portion to effect a gripping action in cooperation therewith.

5. The assembly as defined in claim 4 wherein the second mentioned extension is provided with an arcuate groove in the face thereof disposed in abutting relation to the hand grip member, said hand grip member being provided with a pin projecting into said groove limiting relative rotation between the second extension and the hand grip member.

6. A removable handle for saucepans or the like, comprising an elongate hand grip member, an actuating rod extending through said hand grip member and projecting beyond the opposite ends of said hand grip member, a separate hand grip extension element secured to one end of said actuating rod, a cam element secured to the opposite end of said actuating rod, a gripping assembly fixed to said opposite end of the hand grip member and including a pivoted clamp element for selective engagement with a lip on an associated saucepan or the like, said cam being operatively engaged with said clamping element for actuation of the same upon twisting motion imparted to said extension.

References Cited in the file of this patent
UNITED STATES PATENTS 2,092,198     Anderson _____ Sept. 7, 1937